United States Patent Office 3,222,355
Patented Dec. 7, 1965

3,222,355
DISAZO DYES
Ermanno Gaetani, Milan, Italy, assignor to Aziende
Colori Nazionali Acna S.p.A., Milan, Italy
No Drawing. Filed Feb. 4, 1963, Ser. No. 256,089
Claims priority, application Italy, Dec. 15, 1959,
20,940/59
1 Claim. (Cl. 260—186)

This application is a continuation-in-part of United States Serial No. 22,126, filed April 14, 1960, now U.S. Patent No. 3,092,616.

The present invention relates to a novel dyestuff possessing improved dye characteristics and to a simple and effective process for employing it.

More particularly, the invention relates to a novel disazo dye which is insoluble in water and which is particularly suitable for use in the dyeing of difficult-to-dye materials including polyethylene and polypropylene, especially polypropylene consisting prevailingly (more than 50%) of isotactic macromolecules.

This novel dye is a disazo dye of the formula:

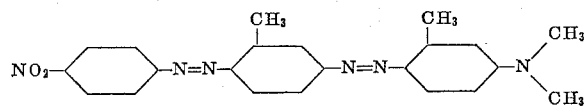

The dye is obtained by disazotizing and coupling an amino azo compound such as 4-amino-2-methyl-4'-nitroazobenzene with a compound such as N-N-dimethyl-meta-toluidine. Suitable relative proportions for these two components are, for example, 1 mole of the disazotized amino azo compound per mole of the metal toluidine compound.

The particular diazotization and coupling procedures employed are not a critical aspect of the present invention and any suitable conventional procedures of this type may be used.

The disazo dye of the present invention exhibits superior color intensity and good light fastness characteristics, especially when employed in the dyeing of shaped articles such as fibers, sheets, etc., obtained from polyolefins, including polypropylene consisting prevailingly of isotactic macromolecules.

The dye can be easily employed by simply contacting the material to be dyed in an aqueous dye bath maintained at its boiling temperature. Thus, for example, a polyolefin is effectively dyed for contacting it in a boiling aqueous dye bath with the disazo dye.

The following examples are given to illustrate the present invention and it should be understood that the invention is not limited thereto.

Example 1

25.6 g. of 4-amino-2-methyl-4'-nitroazobenzene are disazotised in 250 g. of water, 30 g. of dimethylformamide and 40 g. of hydrochloric acid solution (density=1.17) by the addition thereto of 7 g. $NaNO_2$ in 20 g. water while maintaining the temperature at about 10–15° C. The disazo-azo compound obtained is introduced into a solution of 14.5 g. of N,N-dimethyl-meta-toluidine in 200 g. of water and 15 g. of hydrochloric acid solution. After the addition of the disazo compound, a 50% aqueous sodium acetate solution is gradually added until the mass does not exhibit any acid reaction with a Congo red indicator.

The disazoic dye obtained is filtered, washed and dried. It consists of a brownish-red powder (melting point=240° C.) having the formula:

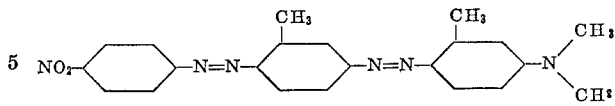

Upon paper chromatographic examination, this dye shows a uniform red spot, which turns to violet upon treatment with hydrochloric acid and remains unchanged upon treatment with sodium hydroxide.

Example 2

A fiber obtained from polypropylene consisting prevailingly of isotactic macromolecules and having the following characteristics:

Intrinsic viscosity (determined at 135° C. in
  Tetralin _____ 1.3
Ash content _____ <0.03
Denier _____ 12
Degree of stretching _____ 5.3 is dyed using the following procedure.

10 grams of the fiber are immersed in 1 liter of an aqueous dye bath containing:

0.02 gram of the dye of Example 1;
0.1 gram of the product obtained by condensing the sulfonation product of naphthalene with formaldehyde;
0.1 gram of the condensation product of castor oil with ethylene oxide (molar ratio=1.35), and
0.01 gram of the condensation product of naphthalene with isobutyl alcohol.

The dyeing step is carried out by contacting the fiber in the dye bath, which is maintained at its boiling temperature, for one hour. The dyed fiber thus obtained is recovered and then rinsed with water.

The dyed polypropylene fiber exhibited an intense color.
Upon subjecting samples of the dyed fiber to a light fastness test with a fadeometer (Atlas, FDAR–FO–2526) it is noted that the dye of the present invention possesses superior light fastness characteristics.

Many variations and modifications can of course be practiced without departing from the scope of the present invention.

Having thus fully described the invention, what I wish to secure and claim by Letters Patent is:

A water-insoluble disazo dye having the formula:

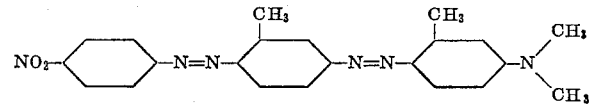

References Cited by the Examiner
UNITED STATES PATENTS 2,424,627  7/1947  Olpin _____ 260—186
3,009,760  11/1961  Lenz _____ 8—4
3,052,510  9/1962  Simpson et al. _____ 8—55

OTHER REFERENCES

Sawicki: J. Org. Chem., volume 23, pages 532–535, April 1958.

CHARLES B. PARKER, Primary Examiner.
IRVING MARCUS, Examiner.